(12) United States Patent
Guan et al.

(10) Patent No.: US 10,363,996 B2
(45) Date of Patent: Jul. 30, 2019

(54) UNMANNED SURFACE VEHICLE AND METHOD OF USING THE SAME

(71) Applicant: Dalian University of Technology, Dalian (CN)

(72) Inventors: Guan Guan, Dalian (CN); Yanyun Yu, Dalian (CN); Ming Chen, Dalian (CN); Yunlong Wang, Dalian (CN); Chaoguang Jin, Dalian (CN); Kai Li, Dalian (CN); Yan Lin, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 15/986,792

(22) Filed: May 22, 2018

(65) Prior Publication Data

US 2018/0339752 A1 Nov. 29, 2018

(30) Foreign Application Priority Data

May 23, 2017 (CN) .......................... 2017 1 0368219

(51) Int. Cl.
| | |
|---|---|
| *B63B 27/08* | (2006.01) |
| *B63B 35/00* | (2006.01) |
| *G05D 1/12* | (2006.01) |
| *B63B 27/14* | (2006.01) |
| *B63B 27/36* | (2006.01) |

(52) U.S. Cl.
CPC ............ *B63B 27/08* (2013.01); *B63B 27/143* (2013.01); *B63B 27/36* (2013.01); *B63B 35/00* (2013.01); *G05D 1/12* (2013.01); *B63B 2035/006* (2013.01)

(58) Field of Classification Search
USPC .......................................................... 701/21
See application file for complete search history.

(56) References Cited

U.S. PATENT DOCUMENTS

| | | | | |
|---|---|---|---|---|
| 2006/0254491 | A1* | 11/2006 | Seiple ..................... | B63B 27/36 114/253 |
| 2008/0301888 | A1* | 12/2008 | Watchorn ................ | B63B 21/00 14/71.1 |
| 2009/0199755 | A1* | 8/2009 | Breivik ................... | B63B 27/24 114/40 |
| 2019/0037821 | A1* | 2/2019 | Jerrett .................... | A01K 73/02 |

* cited by examiner

*Primary Examiner* — James M McPherson
(74) *Attorney, Agent, or Firm* — Matthias Scholl P.C.; Matthias Scholl

(57) ABSTRACT

An unmanned surface vehicle (USV) including a main body; a slideway; and an automatic recovery unit. The slideway includes pulleys, slide rails, sleepers, end plates disposed at two sides of the sleepers, and baffle plates. The automatic recovery unit includes a buoy, a connection rod, a downhaul, an electromagnetic fixer, a winch, an upper cable, a storage box, and a recovery net. The slideway is fixed on the afterdeck of the main body and the tail end of the slideway sticks out the side boundary of the afterdeck. The baffle plates are disposed on the upper end of the end plates. The vertical height of the end plates is larger than the maximum vertical height of the pulleys and the slide rails. The baffle plates on the upper end of the end plates limit the displacement of the buoy in the vertical direction.

2 Claims, 8 Drawing Sheets

UNMANNED SURFACE VEHICLE AND METHOD OF USING THE SAME

CROSS-REFERENCE TO RELATED APPLICATIONS

Pursuant to 35 U.S.C. § 119 and the Paris Convention Treaty, this application claims foreign priority to Chinese Patent Application No. 201710368219.0 filed May 23, 2017, the contents of which and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND

This disclosure relates to the field of marine floating structures, and more particularly, to an unmanned surface vehicle (USV) and a method of using the same for recovering underwater vehicles, robots, and the like.

Conventionally, undercover vehicles are manually retrieved after deployments. However, subject to complex marine environment such as rough seas, the recovery of the underwater vehicles is laborious.

Unmanned surface vehicles are known. They can be used as carriers for underwater vehicles.

SUMMARY

Disclosed is an unmanned surface vehicle (USV) that is adapted to recover underwater vehicles and a method of using the same for recovering underwater vehicles.

Disclosed is an unmanned surface vehicle comprising: a main body comprising an afterdeck and a sternpost; a slideway; and an automatic recovery unit. The slideway comprises pulleys, slide rails, sleepers, end plates disposed at two sides of the sleepers, and baffle plates. The automatic recovery unit comprises a buoy, a connection rod, a downhaul, an electromagnetic fixer, a winch, an upper cable, a storage box, and a recovery net.

The slideway is fixed on the afterdeck of the main body and the tail end of the slideway sticks out the side boundary of the afterdeck; the pulleys slide in the slide rails; the slide rails and the end plates are integrated with the sleepers; the baffle plates are disposed on an upper end of the end plates; the vertical height of the end plates is larger than the maximum vertical height of the pulleys and the slide rails; the buoy is capable of sliding on the slide rails, and the baffle plates on the upper end of the end plates are adapted to limit the displacement of the buoy in the vertical direction; the winch is fixed in the sternpost which comprises a hole; the upper cable is flexible and passes through the hole of the sternpost to connect to the winch fixed in the sternpost; one end of the downhaul is fixed on a stern of the unmanned surface vehicle, and the other end of the downhaul is connected to the recovery net; the recovery net comprises floaters and lead weights; the connection rod comprises a rod body and a snap ring; the snap ring is connected to one end of the upper cable; the electromagnetic fixer comprises a valve shaft which corresponds to the snap ring; the snap ring is disposed on one end of the rob body, and the other end of the rob body is rigidly connected to the buoy; the buoy is rigidly connected to the storage box; and the storage box is adapted to store the recovery net and the downhaul.

Further disclosed is a method of using the unmanned surface vehicle (USV) for recovering underwater vehicles, the method comprising:

1) receiving, by the unmanned surface vehicle, a command for recovering an underwater vehicle;
2) sending, by the unmanned surface vehicle, an order to the underwater vehicle, and allowing the underwater vehicle to emerge out of the water surface;
3) acquiring, by a positioning system of the unmanned surface vehicle, position information of the underwater vehicle;
4) commanding the underwater vehicle to move close to the unmanned surface vehicle, or sailing the unmanned surface vehicle close to the underwater vehicle;
5) controlling the electromagnetic fixer to release the snap ring of the connection rod, allowing the buoy to slide into water along the slideway, unfolding the recovery net, the underwater vehicle being in an area formed by the upper cable, the downhaul, and the recovery net; and
6) rotating the winch to withdraw the upper cable, to achieve the recovery of the underwater vehicle.

Advantages of the unmanned surface vehicle in the disclosure are summarized as below:

1. The application range of the unmanned surface vehicle is widened, and the automatic recovery unit can be controlled remotely.
2. The unmanned surface vehicle can precisely deploy and recover underwater vehicles.
3. The unmanned surface vehicle can be operated in automatic mode.

DETAILED DESCRIPTION

To further illustrate, experiments detailing an unmanned surface vehicle (USV) and a method for using the same are described below. It should be noted that the following examples are intended to describe and not to limit the description.

Figure 1:
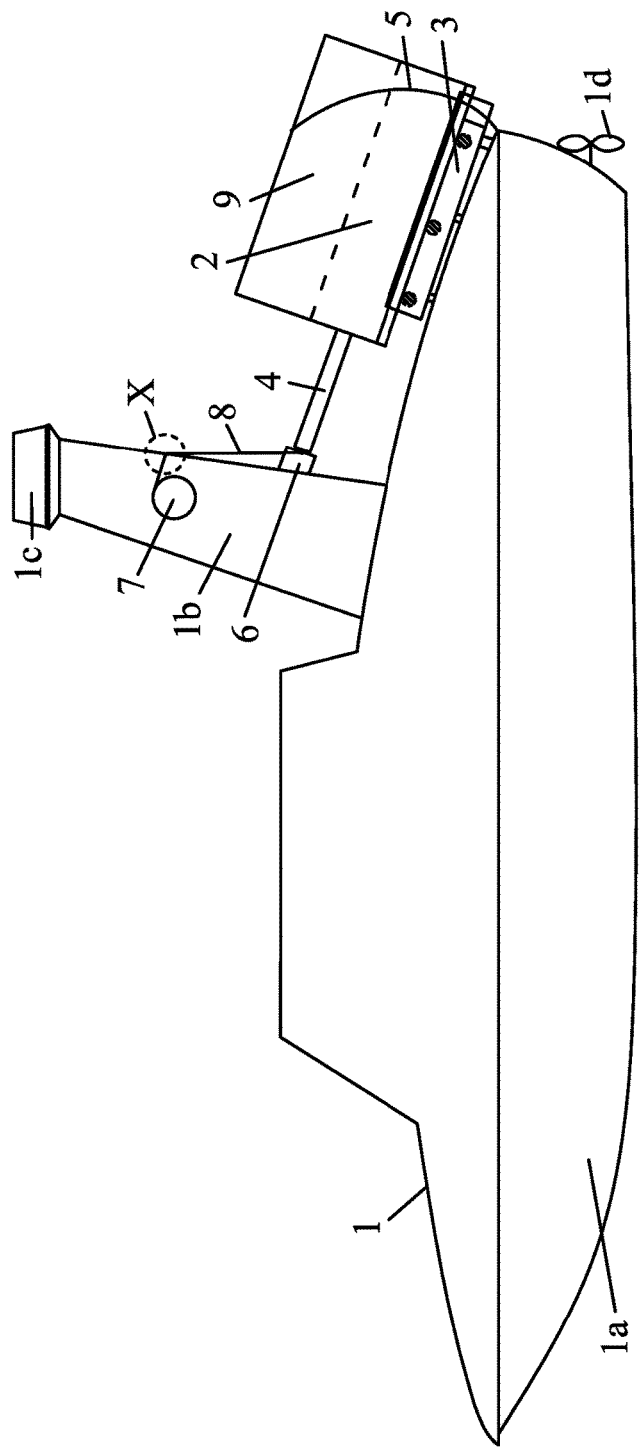
FIG. 1 is a schematic diagram of an unmanned surface vehicle of the disclosure.

FIG. 1 illustrates a schematic diagram of an unmanned surface vehicle of the disclosure. The unmanned surface vehicle comprises a main body comprising an afterdeck and a sternpost; a slideway 3; and an automatic recovery unit. The slideway 3 comprises pulleys 3a, slide rails 3b, sleepers 3c, end plates 3d disposed at two sides of the sleepers, and baffle plates 3e. The automatic recovery unit comprises a buoy 2, a connection rod 4, a downhaul 5, an electromagnetic fixer 6, a winch 7, an upper cable 8, a storage box 9, and a recovery net 10. In nonuse, the buoy 2 is accommodated in the storage box 9. The connection rod 4 is fixed on the buoy 2. The slideway 3 is fixed on the afterdeck of the main body and the tail end of the slideway 3 sticks out the side boundary of the afterdeck. The buoy 2, the storage box 9 and the connection rod 4 are fixed on the slideway 3 via the electromagnetic fixer 6. The unmanned surface vehicle further comprises a control system to control the electromagnetic fixer 6. In nonuse, the electromagnetic fixer 6 is in an inactive state, the snap ring 4b of the connection rod is clamped by the valve shaft of the electromagnetic fixer 6, so that the buoy 2 is fixed and cannot move. When the unmanned surface vehicle operates to recover an underwater vehicle, the control system controls the electromagnetic fixer 6 to enter an active state, and then the snap ring 4b of the connection rod is free and loosened, the buoy 2 slides into the water due to the gravity. The winch 7 is fixed in the sternpost which comprises a hole; the upper cable 8 is flexible and passes through the hole of the sternpost to connect to the winch 7 fixed in the sternpost. The winch 7 is equipped with a clutch to provide tension force for the upper cable 8.

Figure 2:
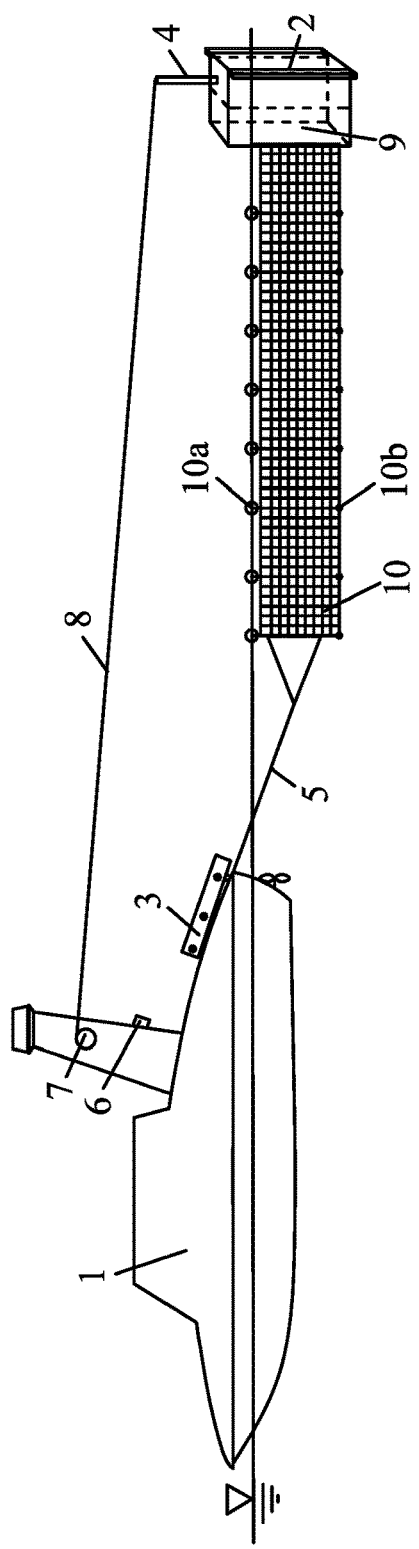
FIG. 2 is a schematic diagram of an unmanned surface vehicle of the disclosure in a water.

FIG. 2 illustrates the unmanned surface vehicle when the automatic recovery unit falls into the water for recovering an underwater vehicle 11. The upper cable 8 is flexible and passes through the hole of the sternpost to connect to the winch 7 fixed in the sternpost, and the downhaul 5 is connected to the stern of the unmanned surface vehicle. The stretching direction of the recovery net 10 of the automatic recovery unit is almost parallel to the navigation direction of the unmanned surface vehicle. The recovery net 10 comprises floaters 10a and lead weights 10b. The floaters 10a cooperate with the lead weights 10b to vertically unfold the recovery net 10.

Figure 3:
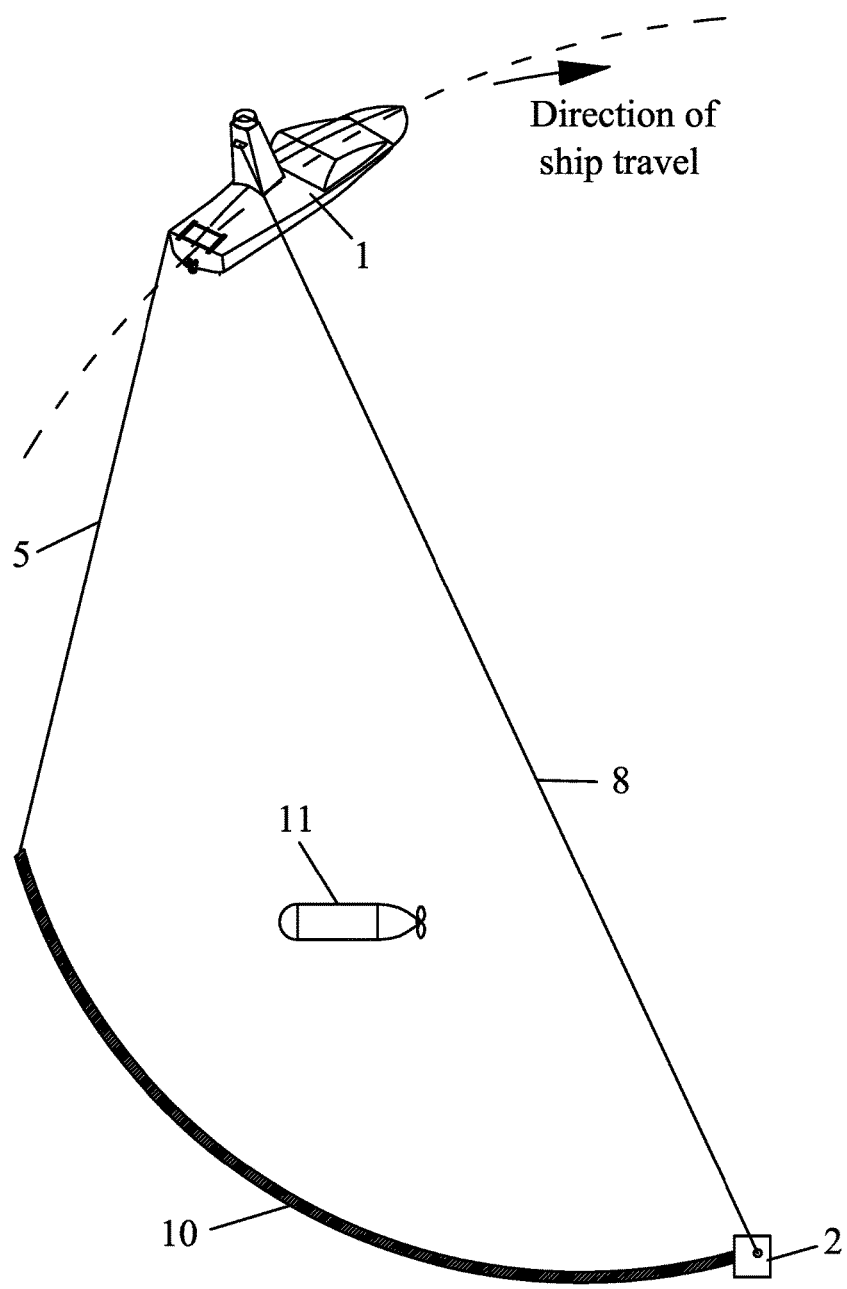
FIG. 3 is an axonometric drawing of an unmanned surface vehicle of the disclosure in a water.

FIG. 3 illustrates a relative position of relevant devices in the process of recovering an underwater vehicle. When the unmanned surface vehicle receives commands for recovering the underwater vehicle, the unmanned surface vehicle issues related commands to the underwater vehicle to make the underwater vehicle emerge from the water. Thereafter, the automatic control system of the unmanned surface vehicle releases the automatic recovery unit into the water. The positioning system of the unmanned surface vehicle acquires the position information of the underwater vehicle 11, and then, following the position information, the unmanned surface vehicle sails to the location where the underwater vehicle 11 is, or, the unmanned surface vehicle issues an order to control the underwater vehicle 11 move to the location where the unmanned surface vehicle is. The underwater vehicle 11 stays in a set position close to the stern of the unmanned surface vehicle. The setting position defines that the underwater vehicle 11 is in the range of length extension of the recovery net 10 and is close to the recovery net 10. Thereafter, the unmanned surface vehicle may replan the voyage, turn to one side, so that the tail end of the unmanned surface vehicle and the two ends of the recovery net 10 form a triangle, and the underwater vehicle is positioned in the triangle formed by the unmanned surface vehicle and the recovery net 10. The control system of the unmanned surface vehicle controls the winch 7 in the sternpost 1b to work, that is, to pull up the upper cable 8. When the extension length of the upper cable 8 is equal to that of the downhaul 5, the unmanned surface vehicle 1 may replan the voyage, turn to another side in a certain angle, sail in the forward direction, and drag the underwater vehicle 11 to the destination. Thus, the underwater vehicle 11 is automatically recovered.

Figure 4:
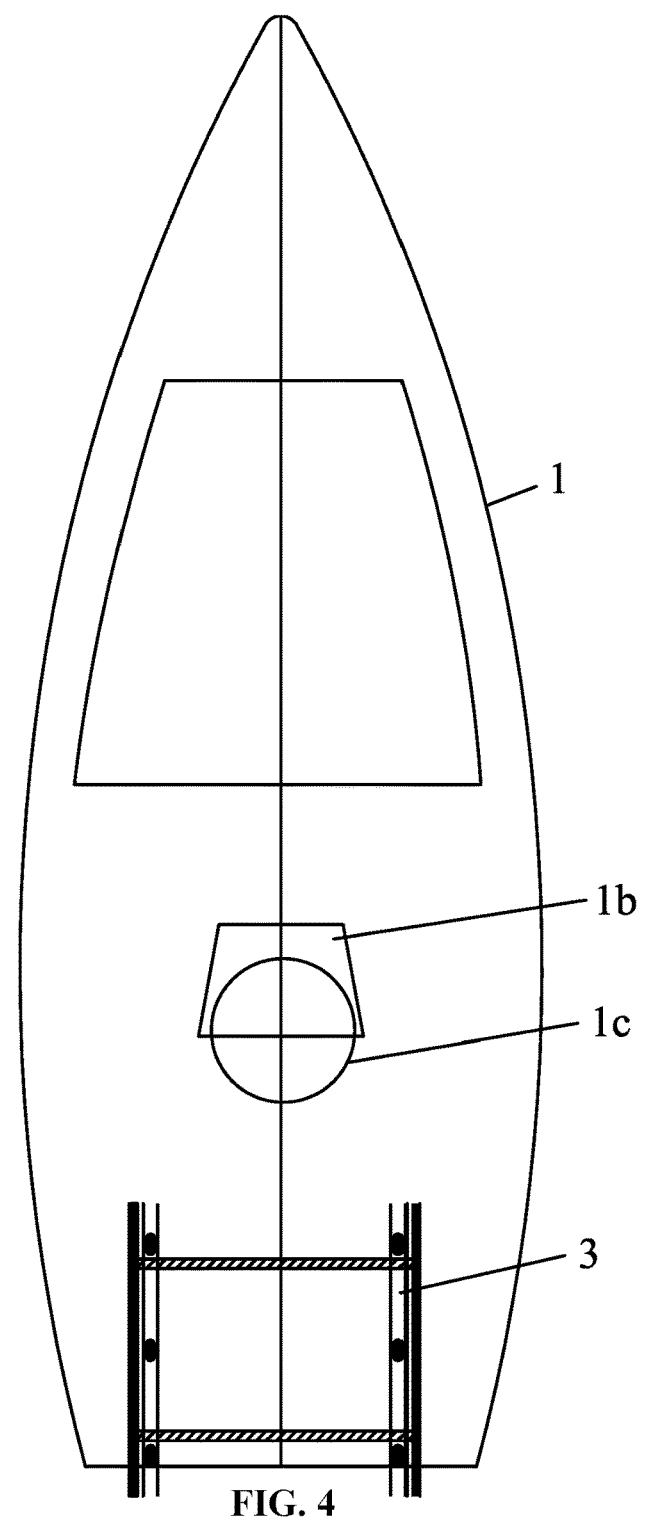
FIG. 4 is a top view of an unmanned surface vehicle of the disclosure.
Figure 5:
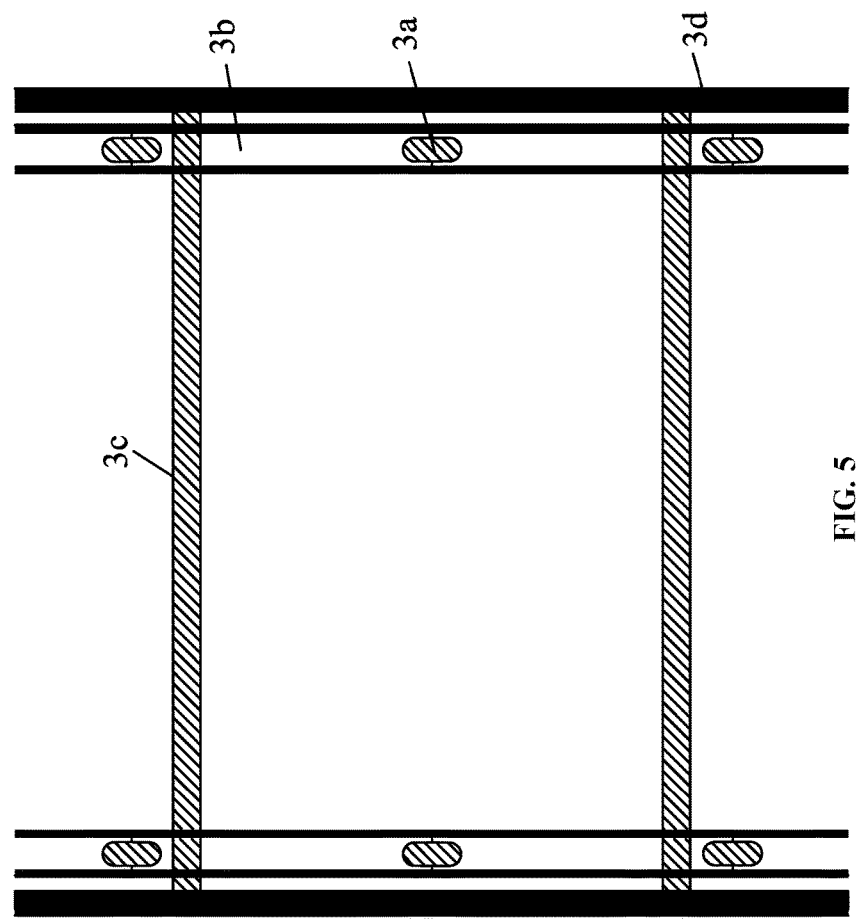
FIG. 5 is a top view of a slideway of the disclosure.
Figure 6:
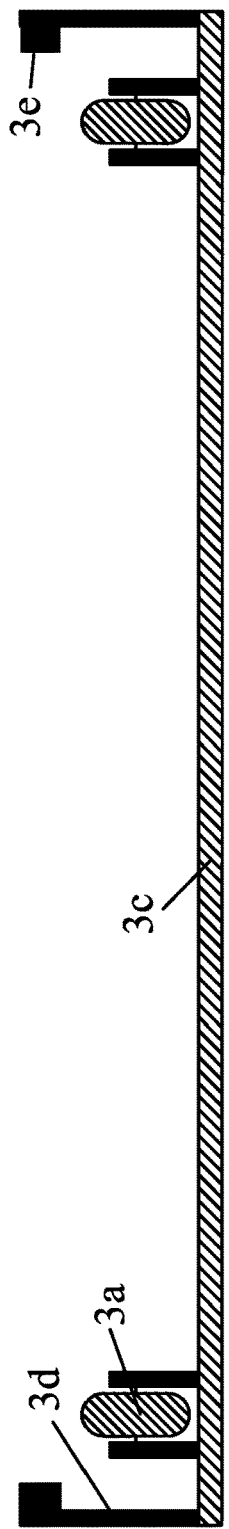
FIG. 6 is a front view of a slideway of the disclosure.

FIGS. 4-6 illustrate the slideway 3 and the layout thereof on the afterdeck of the unmanned surface vehicle. As shown in FIG. 4, the slideway 3 is disposed along the median plane of the unmanned surface vehicle 1. As shown in FIG. 5 and FIG. 6, the slideway 3 may comprise five parts, that is, pulleys 3a, slide rails 3b, sleepers 3c, end plates 3d disposed at two sides of the sleepers, and baffle plates 3e. The tail end of the slideway 3 sticks out the side boundary of the afterdeck, which can prevent the damage of the hull body or the propeller 1d in the process of the sliding of the buoy. The pulleys 3a are fixed on the slide rails 3b, which can reduce the friction in the process of the sliding of the buoy 2 into the water. The vertical height of the end plates 3d is larger than the maximum vertical height of the pulleys 3a and the slide rails 3b; the horizontal distance between the two end plates is larger than the width of the buoy. The end plates 3d is configured to limit the horizontal moving of the buoy 2 when the buoy is fixed on the slideway. The baffle plates 3e are disposed on the upper end of the end plates; the buoy can comprise lower baffle plates. The baffle plates 3e and the lower baffle plates 2a cooperate to clamp the buoy 2 thus limiting the vertical movement of the buoy. The slide rails 3b and the end plates are integrated with the sleepers 3c.

Figure 7:
FIG. 7 is a front view of a connection rod of the disclosure.

FIG. 7 is a schematic diagram of the connection rod 4 which is fixed on the buoy 2. The connection rod 4 comprises a rod body 4a and a snap ring 4b; the snap ring 4b is connected to one end of the upper cable 8. The electromagnetic fixer 6 comprises a valve shaft which corresponds to the snap ring 4b. In nonuse, the electromagnetic fixer 6 can fix the buoy on the afterdeck of the unmanned surface vehicle via the snap ring 4b.

Figure 8:
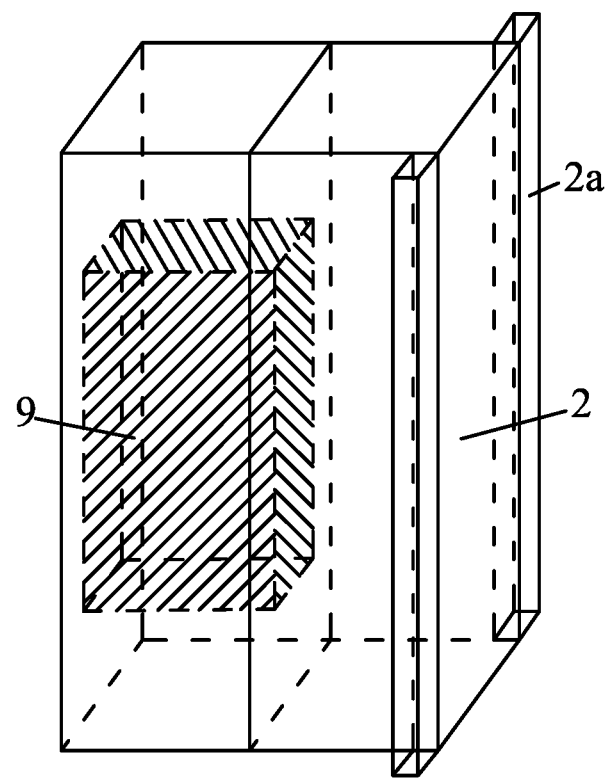
FIG. 8 is an axonometric drawing of a buoy and a storage box of the disclosure.
Figure 9:
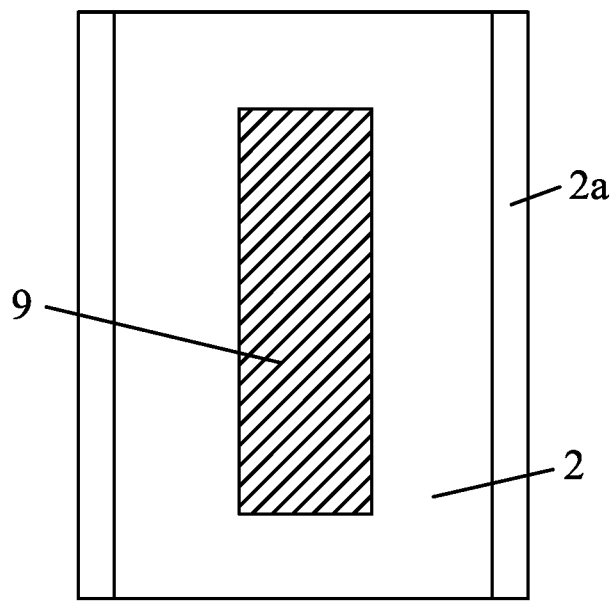
FIG. 9 is a left view of a buoy and a storage box of the disclosure.

FIGS. 8-9 illustrate the layout of the buoy 2 in the storage box 9. The buoy 2 and the storage box 9 are fixed together, and the two all adopt light materials thus ensuring the buoyancy. The bottom ends of the buoy 2 protrude outwards to form lower baffle plates 2a. when the buoy 2 is fixed on the unmanned surface vehicle, the baffle plates 3e of the slideway 3 and the lower baffle plates 2a cooperate to clamp the buoy 2 thus limiting the vertical movement of the buoy.

Figure 10:
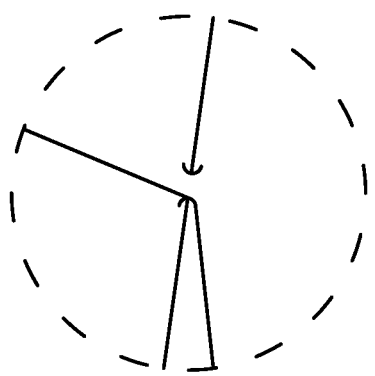
FIG. 10 is a local enlarged view of part X in FIG. 1.

FIG. 10 is a local enlarged view of a hole of the sternpost 1b which allows the upper cable 8 to pass. The diameter of the hole is properly designed and matches the upper cable. The wall of the hole is made of wear-resistant polymer material and the outer part of the hole is funnel-shaped, preventing the upper cable 8 from being exerted with the cutting force and the resistance. The hole can be sealed using porous rubber material, thus it is guaranteed that there will be no water entering the unmanned surface vehicle via the hole.

It will be obvious to those skilled in the art that changes and modifications may be made, and therefore, the aim in the appended claims is to cover all such changes and modifications.

What is claimed is:
1. An apparatus, comprising:
   a main body comprising an afterdeck and a sternpost;
   a slideway comprising pulleys, slide rails, sleepers, end plates disposed at two sides of the sleepers, and baffle plates; and
   an automatic recovery unit, the automatic recovery unit comprising a buoy, a connection rod, a downhaul, an electromagnetic fixer, a winch, an upper cable, a storage box, and a recovery net;

wherein:
- the slideway is fixed on the afterdeck of the main body and a tail end of the slideway sticks out a side boundary of the afterdeck;
- the pulleys slide in the slide rails; the slide rails and the end plates are integrated with the sleepers; the baffle plates are disposed on an upper end of the end plates;
- a vertical height of the end plates is larger than a maximum vertical height of the pulleys and the slide rails;
- the buoy is capable of sliding on the slide rails, and the baffle plates on the upper end of the end plates are adapted to limit the displacement of the buoy in a vertical direction;
- the winch is fixed in the sternpost which comprises a hole; the upper cable is flexible and passes through the hole of the sternpost to connect to the winch fixed in the sternpost;
- one end of the downhaul is fixed on a stern, and the other end of the downhaul is connected to the recovery net;
- the recovery net comprises floaters and lead weights;
- the connection rod comprises a rod body and a snap ring; the snap ring is connected to one end of the upper cable;
- the electromagnetic fixer comprises a valve shaft which corresponds to the snap ring;
- the snap ring is disposed on one end of the rob body, and the other end of the rob body is rigidly connected to the buoy;
- the buoy is rigidly connected to the storage box; and
- the storage box is adapted to store the recovery net and the downhaul.

2. A method of using the apparatus of claim 1, the method comprising:
1) receiving, by the apparatus, a command for recovering an underwater vehicle;
2) sending, by the apparatus, an order to the underwater vehicle, and allowing the underwater vehicle to emerge out of the water surface;
3) acquiring, by a positioning system of the apparatus, position information of the underwater vehicle;
4) commanding the underwater vehicle to move close to the apparatus, or sailing the apparatus close to the underwater vehicle;
5) controlling the electromagnetic fixer to release the snap ring of the connection rod, allowing the buoy to slide into water along the slideway, unfolding the recovery net, the underwater vehicle being in an area formed by the upper cable, the downhaul, and the recovery net; and
6) rotating the winch to withdraw the upper cable, to achieve the recovery of the underwater vehicle.

* * * * *